Figure 1:
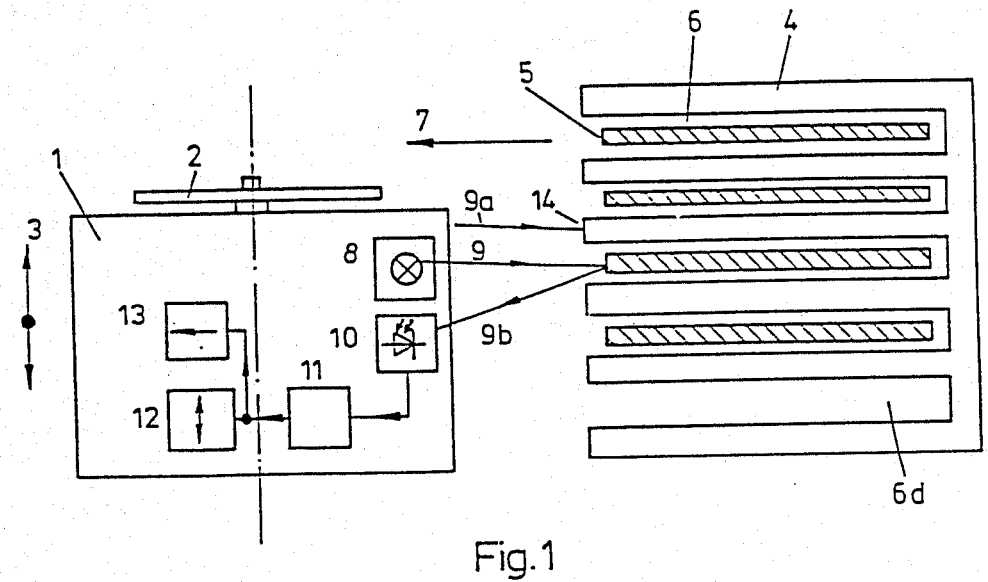

United States Patent [19]

Geiger

[11] Patent Number: 4,807,208
[45] Date of Patent: Feb. 21, 1989

[54] COMPACT-DISK CHANGER

[75] Inventor: Erich Geiger, Unterkirnach, Fed. Rep. of Germany

[73] Assignee: Deutsche Thomson-Brandt GmbH, Villingen-Schwenningen, Fed. Rep. of Germany

[21] Appl. No.: 113,881

[22] Filed: Oct. 27, 1987

[30] Foreign Application Priority Data

Oct. 29, 1986 [DE] Fed. Rep. of Germany ....... 3636784

[51] Int. Cl.⁴ ...................... G11B 17/04; G11B 17/22
[52] U.S. Cl. ........................................ 369/39; 369/34; 369/36
[58] Field of Search ....................... 369/34, 36, 37, 38, 369/39

[56] References Cited

U.S. PATENT DOCUMENTS

| 4,504,936 | 3/1985 | Faber et al. | 369/36 |
| 4,580,256 | 4/1986 | Hojyo et al. | 369/39 |
| 4,601,026 | 7/1986 | Kawakami | 369/38 |
| 4,685,095 | 8/1987 | Rudy et al. | 369/36 |

Primary Examiner—Steven L. Stephan
Attorney, Agent, or Firm—Max Fogiel

[57] ABSTRACT

In a compact-disk changer, the positioning of a playing component (1) in relation to a magazine (4) is controlled for the purpose of removing disks (5) from the magazine in accordance with the invention by an optical link (8–10).

10 Claims, 2 Drawing Sheets

COMPACT-DISK CHANGER

The invention concerns a compact disk changer as recited in the preamble of claim 1.

A compact-disk changer that can play different disks as desired preferably comprises a playing component with a drive mechanism, a scanner, signal-processing circuits, and a magazine accommodating several disks in a stack. Between the playing component and the magazine are means of removing one of the disks from the magazine as needed and positioning it for playing in the playing component. A back-and-forth motion between the playing component and the magazine is necessary for selecting various disks. This motion positions the playing component in relation to the magazine such that a desired disk can be removed from the magazine. It is accordingly necessary to precisely determine and establish the position of the playing component in relation to the magazine.

The object of the invention is to provide a method of positioning the playing component in relation to the magazine in a compact-disk changer of this type that is especially simple and essentially involves no mechanically moved parts.

This object is attained by the invention recited in claim 1. Practical developments of the invention are recited in the subsidiary claims.

Positioning an optical link between the two components results in a particularly simple, reliable, and non-contact means of determining and establishing the relative positions of the playing component and magazine. Mechanically moved components are unnecessary. This is especially practical for a compact-disk changer that it to be employed in an automobile because the function of mechanically moved components can be affected by the acceleration of the vehicle. The reflecting properties of compact disks can be exploited to advantage in accordance with the invention to help determine the position of the playing component in relation to the magazine. Special reflecting marks on the magazine are unnecessary. Another advantage is that the beam of light is not reflected from a compartment in the magazine that does not contain a disk, so that the playing component will in a practical way not stop at that point to remove a disk from the magazine.

The invention will now be described with reference to the drawing, wherein

Figure 2:
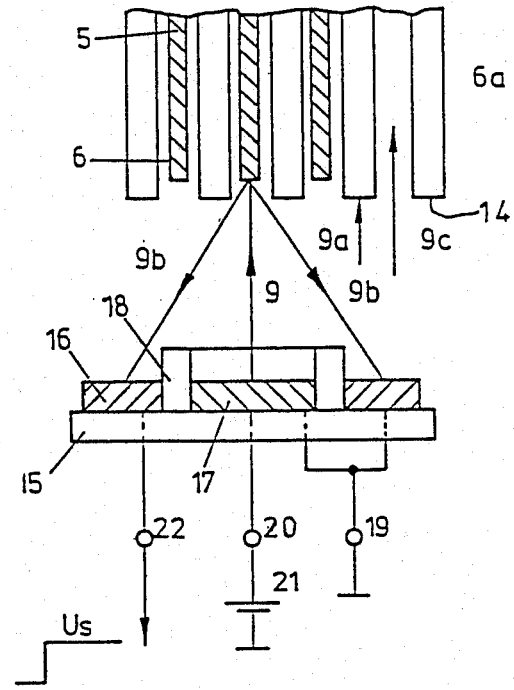
Figure 3:
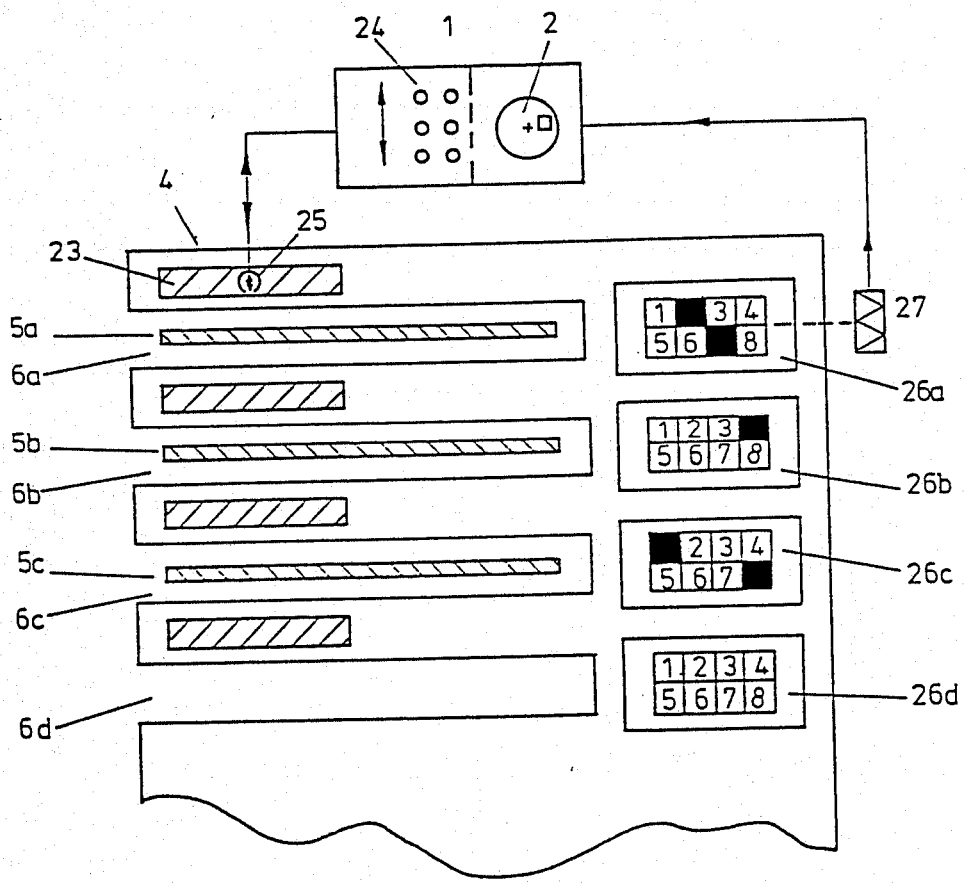

FIG. 1 illustrates the principle behind the interaction between the playing component and the magazine, FIG. 2 illustrates a special type of light source and photoelement, and FIG. 3 illustrates a magazine in conjunction with two developments of the invention.

The playing component 1 illustrated in FIG. 1 is positioned in conjunction with a turntable 2 such that it can slide back and forth in relation to a stationary magazine 4 in order to select various compact disks 5 from the magazine's different compartments 6. One compact disk 5 at a time is removed from magazine 4 by unillustrated means and supplied to turntable 2 in the direction indicated by arrow 7.

Playing component 1 contains a light source 8 that projects a beam 9 or 9a of light onto the left wall of magazine 4. Playing component 1 also accommodates a photoelement 10, a control circuit 11, a drive mechanism 12, and a control stage 13, for removing a disk 5 in the direction indicated by arrow 7.

When playing component 1 moves in the direction indicated by arrow 3 to remove a particular disk 5 from magazine 4, beam 9a of light initially strikes the dark front wall 14 for instance of magazine 4. Since the beam is not reflected from black front wall 14, no light arrives at photoelement 10, and control circuit 11 is induced to maintain the drive mechanism 12 that moves playing component 1 in the direction indicated by arrow 3 in operation, keeping the control stage 13 that removes a disk 5 in the direction indicated by arrow 7 off. A particular compact disk 5 can be selected by moving playing component 1 or magazine 4 in the direction indicated by arrow 3.

Once playing component 1 has arrived at a position in relation to the magazine that is appropriate for removing a disk 5, beam 9 of light will strike the reflecting outer edge of a compact disk 5, reflecting a beam 9b of light that strikes photoelement 10. This activates control circuit 11, switching off the drive mechanism 12 that governs the movement in the direction indicated by arrow 3 and switching on the control stage 13 for removing a disk 5. The reflection of beam 9 of light on the edge of a compact disk 5 is also exploited as a signal that playing component 1 has assumed a position in relation to magazine 4 that is appropriate for removing a compact disk 5. There is also no reflection when beam 9 of light strikes a compartment 6d that does not contain a disk 5, and the control stage 13 for removing a disk 5 is not triggered.

FIG. 2 illustrates a device that simultaneously comprises a light source 8 and a photoelement 10. A semiconductor component in the form of an annular photocell 16 is mounted on a semiconductor substrate 15. Also mounted on substrate 15 in the opening at the center of photocell 16 is another semiconductor component in the form of a gallium-arsenide light-emitting diode 17. Between photocell 16 and light-emitting diode 17 is an annular shield 18. Photocell 16 and light-emitting diode 17 have a common connection 19 that is also connected to ground. Connected to another connection 20 to light-emitting diode 17 is a battery 21 for illuminating diode 17 and generating beam 9 of light. The reflected beam 9b of light strikes annular photocell 16 and generates a voltage $U_s$ at its terminal 22 that is processed in the control circuit 11 illustrated in FIG. 1. Annular shield 18 prevents light emitted from light-emitting diode 17 from arriving directly at photocell 17. The circuitry is specified in German Pat. No. 2 425 855.

FIG. 3 illustrates a magazine 4 with two additional characteristics in accordance with further developments of the invention.

A magnetic strip 23 that functions as a read-and-write memory is associated with each compartment 6a through 6d. The address of the disk 5a in compartment 6a can be entered into magnetic strip 23 from the keypad 24 on playing component 1 in conjunction with a scanner 25. Magnetic strip 23 will accordingly contain the address of the disk 5a in compartment 6a. The other compartments 6b through 6d are similarly constructed. To play a desired disk 5, its address is entered in playing component 1 through keypad 24. As playing component 1 moves in relation to magazine 4 as illustrated in FIG. 1, magnetic strip 23 is scanned by scanner 25. When the address in magnetic strip 23 agrees with the address entered through keypad 24, the motion of playing component 1 in the direction indicated by arrow 3 in FIG. 1 is discontinued and a disk 5 removed from compartment 6. Keypad 24, which can in an automobile for example be remote from playing component 1 and magazine 4, can accordingly be employed to supply any desired disk 5 in the magazine to the playing component for playing. Other types of memory—optical or solid state for instance—can also be employed instead of a magnetic strip as long as they can accept and release the addresses and be erased to accommodate other addresses. Memories of this type, which are employed to accommodate and recognize addresses in cassettes, are described for example in German OS No. 2 943 409.

Also associated with each compartment 6 illustrated in FIG. 3 is a numerical field 26 consisting of the numbers 1–8 representing the individual pieces, long or short pieces of music for instance, recorded on disk 5. There will in practice be more than eight numbers. The operator marks the numbers for the pieces on any disk 5 that he would like to hear with a black pencil, as represented by the black squares. When a disk 5a is supplied for playing to playing component 1, the numerical field is scanned by optical-electric scanner 27 and the results supplied to playing component 1. The scanning advance of playing component 1 is controlled in such a way that only the marked pieces 2 and 7 will be played, and the intermediate pieces will be skipped over by the rapid-search mechanism at very brief intervals of approximately 1 to 2 seconds. Thus, only piece 4 on disk 5a might be played along with pieces 1 and 8 on disk 5c. No number is marked on numerical field 26d because there is no disk in compartment 6d.

Thus, the addressing of magnetic strip 23 allows, in conjunction with the processing of the marked numbers on numerical field 26, the selection of any desired piece on any desired disk 5 in any desired sequence. Playing component 1 preferably contains a memory for the addresses on disks 5 that are supplied in sequence to playing component 1 to allow the pieces marked in the numerical fields 26 associated with each disk to be played.

Magazine 4 can also consist of individual containers, each of which contains one disk. Each compact disk for example is accommodated in a housing that is open at one side, and the individual housings or containers for the disks are combined into a magazine 4 with snaps or other mechanical snap-in connections.

I claim:

1. A compact disk changer comprising: playing means; magazine means with an open side containing disks; means for moving said playing means and said magazine means back and forth relative to each other for removing various disks; optical means between said playing means and said magazine means for positioning said playing means in relation to said magazine; said magazine having walls facing said playing means and being nonreflective to light; said optical means comprising a light source on said playing means for projecting a beam of light to the open side of said magazine means, and a photoelement on said playing means for detecting light reflected from disks lying in said magazine means.

2. A compact-disk changer as defined in claim 1, including a control circuit connected to said photoelement for positioning said playing means in relation to said magazine means and for removing a disk from said magazine means.

3. A disk changer as defined in claim 1, wherein said photoelement comprises a ring surrounding said light source.

4. A compact-disk changer as defined in claim 3, wherein said light source comprises a light-emitting diode and said photoelement comprises a photocell, said light-emitting diode and said photocell comprising semiconductor components; and a substrate for mounting said light-emitting diode and said photocell.

5. A compact-disk changer as defined in claim 1, wherein said magazine means is stationary, said playing means being mounted so that it is movable in relation to said stationary magazine for removing various disks.

6. A compact-disk changer as defined in claim 1, wherein said magazine means has a compartment for holding each disk therein; and a memory element comprising a magnetic strip associated with each compartment in said magazine means, each disk having a code that can be entered on said memory element and that can be read out from said memory element to control removal of each disk by said playing means.

7. A compact-disk changer as defined in claim 1, including means for marking a numerical field manually in conjunction with recordings on the disk; said magazine means having a compartment for each disk, each compartment being associated with a numerical field; means for scanning the numerical field and actuating said playing means to play the recordings that have been marked.

8. A compact-disk changer as defined in claim 1, wherein said magazine means comprises individual containers, each container holding one disk.

9. A compact disk changer comprising: playing means; magazine means with open side containing disks; means for moving said playing means and said magazine means back and forth relative to each other for removing various disks; optical means between said playing means and said magazine means for positioning said playing means in relation to said magazine; said magazine having walls facing said playing means and being nonreflective to light; said optical means comprising a light source on said playing means for projecting a beam of light to the open side of said magazine means, and a photoelement on said playing means for detecting light reflected from disks lying in said magazine means; a control circuit connected to said photoelement for positioning said playing means in relation to said magazine means and for removing a disk from said magazine means; said photoelement comprising a ring surrounding said light source; said light source comprising a light-emitting diode and said photoelement comprising a photocell, said light-emitting diode and said photocell comprising semiconductor components, a substrate for mounting said semiconductor components; said magazine means being stationary, said playing means being mounted so that it is movable in relation to said stationary magazine means for removing various disks; said magazine means comprising a plurality of compartments, each compartment holding a disk; a memory element comprising a magnetic strip associated with each compartment in said magazine means, each disk having a code that can be entered into said memory element and that can be read out of said memory element to control removal of a disk by said playing means.

10. A compact disk changer comprising: playing means; magazine means with open side containing disks; means for moving said playing means and said magazine means back and forth relative to each other for removing various disks; optical means between said playing means and said magazine means for positioning said playing means in relation to said magazine; said magazine having walls facing said playing means and being nonreflective to light; said optical means comprising a light source on said playing means for projecting a beam of light to the open side of said magazine means, and a photoelement on said playing means for detecting light reflected from disks lying in said magazine means; a control circuit connected to said photoelement for positioning said playing means in relation to said magazine means and for removing a disk from said magazine means; said photoelement comprising a ring surrounding said light source; said light source comprising a light-emitting diode and said photoelement comprising a photocell, said light-emitting diode and said photocell comprising semiconductor components, a substrate for mounting said semiconductor components; said magazine means being stationary, said playing means being mounted so that it is movable in relation to said stationary magazine means for removing various disks; said magazine means comprising a plurality of compartments, each compartment holding a disk; a memory element comprising a magnetic strip associated with each compartment in said magazine means, each disk having a code that can be entered into said memory element and that can be read out of said memory element to control removal of a disk by said playing means; means for marking a numerical field manually in conjunction with recordings on a disk, said numerical field being associated with each compartment; and means for scanning said numerical field to actuate said playing means to play the marked recordings.

* * * * *